United States Patent
Ao et al.

(10) Patent No.: US 7,054,564 B2
(45) Date of Patent: May 30, 2006

(54) OPEN LOOP THERMAL COMPENSATION CIRCUIT THAT IS SUITABLE FOR USE IN BURST-MODE LASER TRANSMITTERS

(75) Inventors: Jiening Ao, Suwanee, GA (US); Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 808 days.

(21) Appl. No.: 10/166,803

(22) Filed: Jun. 11, 2002

(65) Prior Publication Data
US 2002/0181057 A1     Dec. 5, 2002

Related U.S. Application Data

(63) Continuation-in-part of application No. 09/840,753, filed on Apr. 23, 2001, now Pat. No. 6,509,994.

(51) Int. Cl.
*H04B 10/00* (2006.01)
(52) U.S. Cl. ........................... 398/192; 398/197
(58) Field of Classification Search ......... 398/192–199
See application file for complete search history.

(56) References Cited

U.S. PATENT DOCUMENTS

| | | | | |
|---|---|---|---|---|
| 5,646,763 A | * | 7/1997 | Misaizu et al. | 398/197 |
| 6,137,607 A | | 10/2000 | Feldman et al. | 359/125 |
| 6,795,656 B1 | * | 9/2004 | Ikeuchi et al. | 398/197 |

OTHER PUBLICATIONS

Scientific-Atlanta, Inc. Pending U.S. Appl. No. 09/840,753, filed Apr. 23, 2001, Title: "Burst-Mode Analog Transmitter," Inventors: Lamar E. West, Jr. and Donald C. Sorenson.

* cited by examiner

*Primary Examiner*—Agustin Bello

(57) ABSTRACT

The present invention is directed towards an open-loop thermal compensation circuit that is suitable for use in a burst-mode laser transmitter. The compensation circuit adjusts the optical power level to ensure that the laser diode remains at an optimum power level. The thermal compensation circuit includes a thermistor having a thermal current, which is dependent upon any temperature fluctuations, where the thermal current adjusts a laser current. A change in the laser current subsequently adjusts the optical power level. Also included is a control circuit for turning on and off the laser diode with a control current, which is dependent upon the presence or absence of incoming electrical signals.

6 Claims, 4 Drawing Sheets

OPEN LOOP THERMAL COMPENSATION CIRCUIT THAT IS SUITABLE FOR USE IN BURST-MODE LASER TRANSMITTERS

RELATED APPLICATIONS

This application is a continuation-in-part of application Ser. No. 09/840,753, now U.S. Pat. No. 6,509,994 entitled "Burst-Mode Analog Transmitter", filed on Apr. 23, 2001, the contents of which are entirely incorporated herein by reference.

FIELD OF THE INVENTION

This invention relates generally to broadband communications system, such as a cable television system, and more specifically to a burst-mode laser transmitter and an open loop thermal compensation circuit that is suitable for use in the burst-mode laser transmitter.

BACKGROUND OF THE INVENTION

Conventional laser, or optical, transmitters include a closed-loop compensation circuit for adjusting the current flow across the laser diode. The current flow is continuously adjusted in response to any current level fluctuations in order to maintain a predetermined output optical power level. It is known that surrounding temperature changes are typically the cause of current fluctuations. It will be appreciated that a compensation, or bias, circuit is necessary to maintain the predetermined optical power level over the operating temperature range of the laser diode. A typical temperature range at the laser location in the transmitter is, for example, from $-20°$ C. to $+85°$ C.

Since the conventional optical transmitter operates in a continuous mode, i.e., provides a continuous output optical signal, a closed-loop control or an automatic power control circuit is widely used to control the current fluctuations. More specifically, the closed-loop control circuit continuously monitors and adjusts the current across the diode in order to maintain the desired optical power. FIG. 1 illustrates a simplistic diagram of a closed-loop compensation circuit 100 that is suitable for use in the conventional optical transmitter. A laser diode 105 launches a certain desired level of optical power and a photodiode 110 generates an electrical current that is directly proportional to the optical power. If the power level drifts from its established desired nominal level, a bias control circuit 115 detects the change in the electrical current provided by the photodiode 110 and subsequently varies the laser current until the desired optical power level is again reached. Accordingly, the closed-loop circuit provides constant adjustments to the optical power.

While the closed-loop compensation circuit 100 is appropriate for the conventional optical transmitter, it does not work effectively for a burst-mode laser transmitter. It will be appreciated that the burst-mode transmitter is essentially turned off and does not transmit an optical signal until a burst-mode incoming signal is received. Only upon receiving the incoming signal will the burst-mode transmitter operate in comparison to the constant transmission of optical signals at the output of the conventional transmitters. Accordingly, the closed-loop compensation circuit 100 does not adjust the power level quickly enough to accommodate the burst-mode incoming signals. What is needed, therefore, is a compensation circuit that maintains the desired operating power level in response to any temperature fluctuations within the burst-mode optical transmitter.

DETAILED DESCRIPTION OF A PREFERRED EMBODIMENT

The present invention will be described more fully hereinafter with reference to the accompanying drawings in which like numerals represent like elements throughout the figures, and in which an exemplary embodiment of the invention is shown. This invention may, however, be embodied in many different forms and should not be construed as limited to the embodiment set forth herein; rather, the embodiment is provided so that this disclosure will be thorough and complete, and will fully convey the scope of the invention to those skilled in the art. For example, the present invention is detailed and explained relative to a thermal compensation circuit that is used to regulate operating currents in accordance with the environment temperature of a burst-mode optical transmitter; however, the present invention is not limited to the circuit as illustrated or used exclusively with the burst-mode optical transmitter. The present invention is described more fully hereinbelow.

Figure 1:
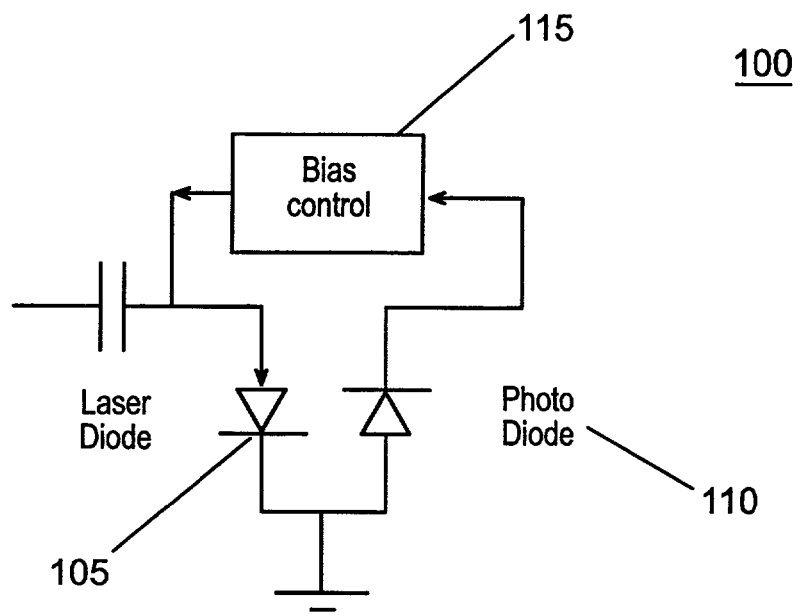
FIG. 1 illustrates a simplistic diagram of a closed-loop compensation circuit that is suitable for use in a conventional optical transmitter.

As mentioned, burst-mode optical transmitters do not transmit optical signals at all times. In operation, they only transmit an output optical signal upon receiving an incoming electrical signal. It will be appreciated that the incoming signals can be of various lengths of data, where some signals can be as short as 10 microseconds in the case of a DOCSIS burst signal. Accordingly, due to the burst-mode nature of the incoming signals, a closed-loop thermal compensation circuit, such as the circuit shown in FIG. 1, is not plausible because of the amount of time that the compensation circuit requires to adjust the current levels in response to any fluctuations. More specifically, the closed-loop compensation circuit takes a significant amount of time to adjust the laser current in comparison with the length of many incoming signals and the signal's delay time within the burst-mode transmitter.

Figure 2:
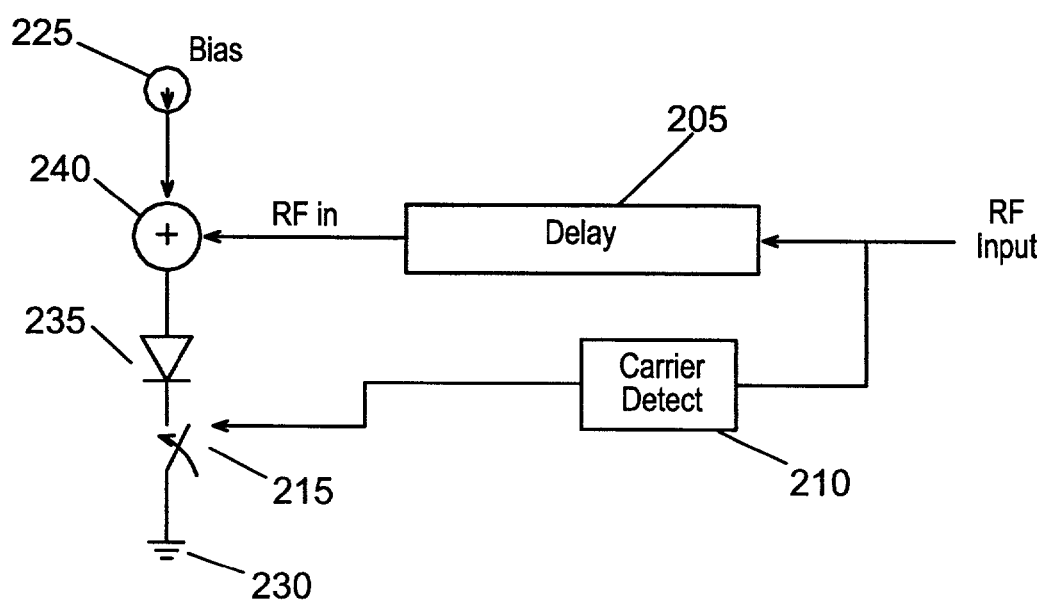
FIG. 2 is a block diagram of a first embodiment of a burst-mode optical transmitter.

FIG. 2 illustrates a first embodiment of a burst-mode optical transmitter 200. Incoming electrical signals are received at the optical transmitter 200 and provided to an analog delay circuit 205. An analog carrier-detect circuit 210 is also coupled to the input of the optical transmitter 200 to detect when electrical signals are provided to the delay circuit 205. The analog carrier-detect circuit 210, as those skilled in the art will appreciate, may include a combination of transistors, capacitors, and resistors. For example, one embodiment may include a comparator that compares a voltage reference with the voltage level of any incoming electrical signals. Accordingly, the carrier-detect circuit 210 then controls a switch 215 depending upon the presence of reverse signal activity. More specifically, when the carrier-detect circuit 210 detects the presence of incoming signals, the carrier-detect circuit 210 closes the switch 215 that allows a path for laser bias 225 to pass current through to ground 230.

The delay circuit 205, which may be, for example, simply excess coaxial cable within the transmitter 200, is provided because it takes some time for the carrier-detect circuit 210 to detect the presence of incoming signals. Alternatively, the delay circuit may be, for example, a linear-phase low pass filter, where the number of filters depends upon the magnitude of the desired delay. The delay circuit 205, therefore, allows the transmission of the entire signal by delaying the signal sufficiently to allow the carrier-detect circuit 210 to detect the signals and close the switch 215. When the switch 215 is closed, laser 235 is enabled by current flow from the laser bias 225. The output of the delay circuit 205 is summed via summer 240 with the laser bias current and then applied to the laser 235. The laser 235 then converts the electrical signal to an optical signal. More specifically, the laser 235 provides the optical signal as an output power that is generally linearly proportional to the amount of current provided by the electrical signals. The laser light emitted by laser 235 is coupled to the fiber optic portion of a communications system.

Figure 3:
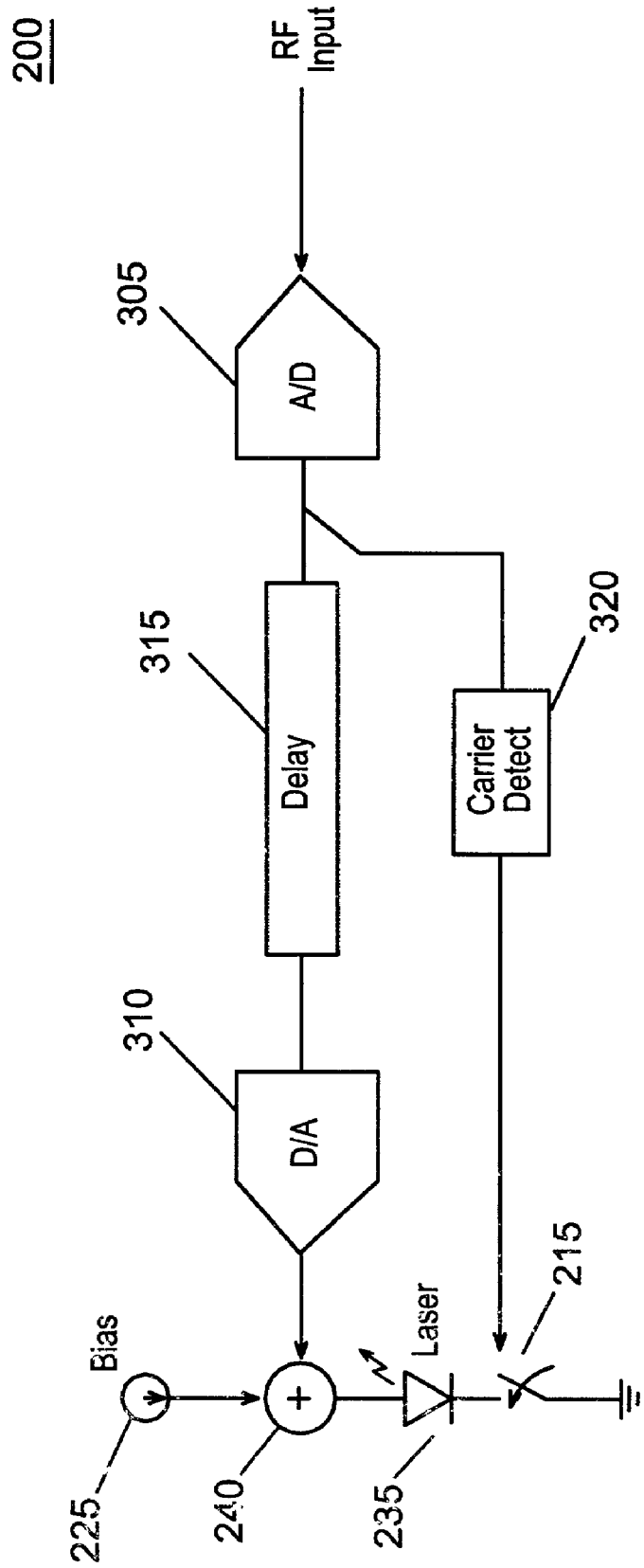
FIG. 3 is a block diagram of a second embodiment of the burst-mode optical transmitter.

A second embodiment of a burst-mode transmitter is shown in FIG. 3. The burst-mode optical transmitter 200 first changes the incoming electrical signal to a digital signal via an analog-to-digital (A/D) converter 305. The digital signal is then converted back to an electrical signal via a digital-to-analog (D/A) converter 310 before transmission through the communications system. Advantageously, the digitization of the electrical signals facilitates the use of a low-cost digital delay circuit 315, such as registers or random access memory (RAM), to introduce any delay necessary to give carrier-detect circuit 320 sufficient time to detect the presence of the electrical signal. Moreover, the carrier-detect circuit 320 may be implemented using a low-cost digital format that includes a few gates and counters, rather than the carrier-detect circuit 210 of FIG. 2, which uses several analog components. Similar to the first embodiment of the optical transmitter 200, the carrier-detect circuit 320 controls switch 325 when a signal is detected, thereby allowing current provided from laser bias 230 to flow through to ground, thereby enabling laser 235. The laser bias current is then summed with the electrical signals via summer 240. Finally, the laser 235 provides an optical signal that is in accordance with the electrical signal for further transmission.

Figure 4:
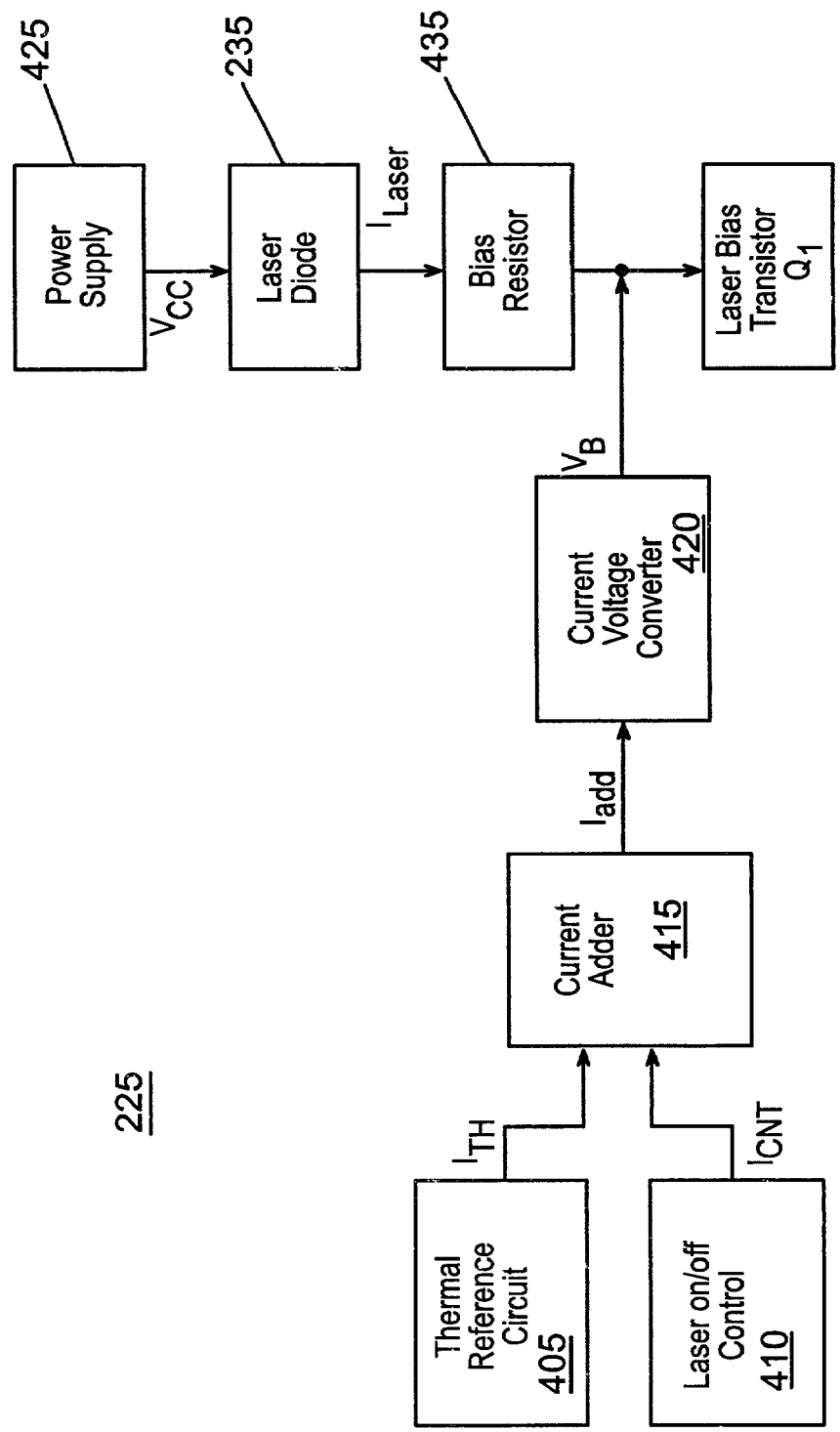
FIG. 4 is a block diagram of an open-loop thermal compensation circuit that is suitable for use in the burst-mode laser transmitter of FIGS. 2 and 3.

FIG. 4 illustrates a block diagram of the thermal compensation bias circuit 225 in accordance with the present invention that is suitable for use in the burst-mode optical transmitter 200. A thermal reference circuit 405 provides a thermal current $I_{TH}$ that is approximately proportional to the surrounding temperature. A laser on/off control circuit 410 can be included in the bias circuit 225 to provide a control current $I_{CNTL}$ that turns on and off the laser diode. The on/off control circuit 410 can replace the switch 215 as shown in FIGS. 2 and 3. A current adder 415 adds $I_{TH}$ and $I_{CNTL}$ to provide $I_{ADD}$. The current $I_{ADD}$ then either turns off the laser when the control circuit 410 is in an "off state" or, alternatively, it provides the control current $I_{ADD}$ which is proportional to the environment temperature during the "on state" to adjust for any temperature fluctuations. A current-voltage converter 420 converts $I_{ADD}$ to a voltage $V_B$, where the voltage $V_B$ is inversely proportional to the temperature during the "on state". A voltage $V_{CC}$ is provided by power supply 425 to drive the laser diode 235. Accordingly, the voltage drop across bias resistor 435 and driving current $I_{laser}$ of the laser 235 is approximately proportional to the temperature, or inversely proportional to $V_B$, so that the optical power level of the laser 235 remains approximately constant over temperature.

Figure 5:
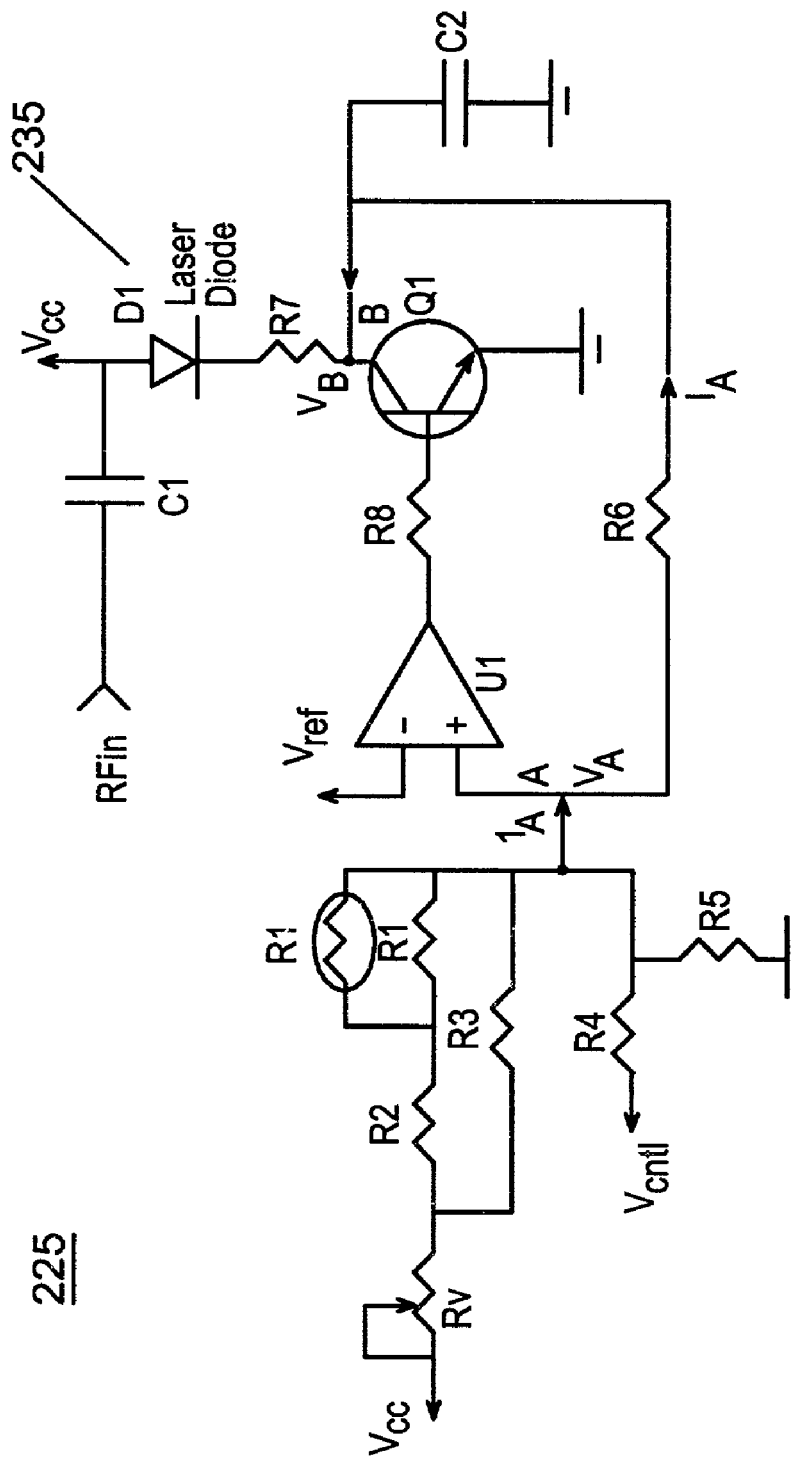
FIG. 5 is a schematic of a preferred embodiment of the open-loop thermal compensation circuit of FIG. 4.

FIG. 5 is a schematic of a preferred embodiment of the open-loop thermal compensation circuit of FIG. 4. Referring to FIG. 5 in conjunction with FIG. 4, the thermal reference circuit 405 includes a negative temperature coefficient thermistor $R_T$ and matching resistors $R_1$, $R_2$, $R_3$. The matching resistors are added to shape the compensation circuit temperature curve for the optimum characteristic match with the laser 235. As the temperature fluctuates, the thermistor $R_T$ changes the current value $I_{TH}$. For example, when the temperature increases, the thermistor value decreases, thereby increasing the summing current $I_A$. Also optionally included in the thermal reference circuit 405 is a variable potentiometer $R_V$ that can be manually adjusted to adjust the optical power level at room temperature.

The laser on/off control circuit 430 includes a voltage $V_{CNTL}$ and resistors $R_4$, $R_5$. It will be appreciated that the on/off control circuit 430 can replace the switch 215 shown in FIGS. 2 and 3, thereby turning on and off the optical transmitter 200 depending upon the presence of an incoming signal. More specifically, upon detection of an incoming signal, the carrier-detect circuit 210, 320 controls the current $I_{CNTL}$. Current $I_{CNTL}$ is then added with current $I_{TH}$ to provide the summing current $I_A$.

An operational amplifier (opamp) $U_1$ forces the voltage $V_A$ to equal a reference voltage $V_{ref}$, thereby adjusting the current $I_A$ across resistor $R_6$. The summing current $I_A$ at the opamp $U_1$ noninverting input and resistor $R_6$, therefore, determine the voltage $V_B$, (i.e., $V_B = V_A - (I_A * R_6)$) at the collector of transistor $Q_1$. Transistor $Q_1$ provides the forward driving current $I_{laser}$ for the laser diode 235 that generates a certain level of optical power $P_{opt}$, where $I_{laser}$ is a function of $V_B$, (i.e., $I_{laser} = (V_{CC} - V_B - V_{laser})/R_7$). In summary, when the temperature increases, the thermistor $R_T$ value decreases, which results in an increase in the summing current $I_A$. An increase in the summing current $I_A$ causes an increase in the laser current $I_{laser}$, thereby increasing the optical power $P_{opt}$. Accordingly, the thermal compensation circuit 225 adjusts the optical power depending upon the temperature surrounding the thermistor.

It will be appreciated that opamp $U_1$ and transistor $Q_1$ are chosen to be fast processing times to ensure that the response time for this circuit 225 is shorter than the delay time of the delay 205 of the burst-mode optical transmitter 200. Importantly, this ensures that the correct power level is set prior to the burst-mode signal being provided to the $RF_{in}$ port.

What is claimed is:

1. An open-loop thermal compensation circuit for use in a burst-mode optical transmitter, the open-loop thermal compensation circuit comprising:

a laser diode for converting an electrical signal to an optical signal, the laser diode having an optimum optical power level, wherein the optical power level drifts over any temperature fluctuation; and a thermal reference circuit for supplying a thermal current $I_{TH}$ in accordance with a surrounding temperature for adjusting the drifted optical power level, wherein when the thermal current increases, the adjusted optical power level increases, and wherein when the thermal current decreases, the adjusted optical power level decreases;

a voltage control circuit for providing a control current $I_{CNTL}$ for turning the laser diode on when the burst-mode optical transmitter detects an incoming electrical signal, wherein the burst-mode optical transmitter provides an indication signal that the electrical signal is present, and wherein the voltage control circuit turns the laser diode off in the absence of the electrical signal;

adding means for adding the thermal current $I_{TH}$ and the control current $I_{CNTL}$ to provide a summing current $I_A$, wherein the summing current $I_A$ is provided as a summing voltage $V_A$;

an operational amplifier for receiving the summing voltage $V_A$ and for adjusting the summing voltage to equal a reference voltage $V_{ref}$, wherein the adjusted summing voltage provides an adjusted summing current; and a voltage converter for converting the adjusted summing current to a laser voltage $V_B$, wherein the laser voltage $V_B$ adjusts a laser current $I_{laser}$, and wherein the laser current $I_{laser}$ is a function of the optical power level, whereby the thermal reference circuit ensures that the optical power level remains at the optimum power level.

2. The open-loop thermal compensation circuit of claim 1, wherein the thermal reference circuit comprises:

a thermistor for providing the thermal current that is determined by the surrounding temperature; and matching resistors for shaping a known thermistor temperature compensation curve to match characteristics of the laser diode.

3. The open-loop thermal compensation circuit of claim 1, wherein a carrier-detect circuit of the burst-mode optical transmitter detects the presence of the electrical signal and, upon detection, provides the indication signal.

4. A burst-mode optical transmitter for receiving an electrical signal and for providing an optical signal, comprising:

a carrier-detect circuit coupled to an input of the optical transmitter for detecting the presence of the electrical signal;

a voltage control circuit responsive to the carrier-detect circuit, wherein the carrier-detect circuit provides an indication signal when the presence of the electrical signal is detected; and wherein the voltage control circuit provides a control current for turning the laser diode on in the presence of electrical signals, and for turning the laser diode off in the absence of electrical signals a delay circuit coupled to the input for delaying the electrical signal;

a laser diode having an optimum optical power level, the laser diode for converting the delayed electrical signal into the optical signal, wherein the optical power level drifts over temperature fluctuations; and a thermal compensation circuit for providing an adjusting value that is combined with the delayed electrical signal, wherein the adjusting value adjusts the optical power level to ensure the optical power level remains at the optimum power level, the thermal compensation circuit comprising:

adding means for adding the thermal current and the control current to provide a summing current, wherein the summing current is provided as a summing voltage;

an operational amplifier for receiving the summing voltage and for adjusting the summing voltage to equal a reference voltage, wherein the adjusted summing voltage provides an adjusted summing current; and a voltage converter for converting the adjusted summing current to a laser voltage, wherein the laser voltage adjusts a laser current, and wherein the laser current is a function of the optical power level.

5. The burst-mode optical transmitter of claim 4, the thermal compensation circuit comprising:

a thermistor for providing a thermal current that is determined by the surrounding temperature; and matching resistors for shaping a known thermistor temperature compensation curve to match characteristics of the laser diode.

6. The burst-mode optical transmitter of claim 4, further comprising:

an analog-to-digital converter coupled between the input of the optical transmitter and the carrier-detect circuit for converting the electrical signals to digital signals; and a digital-to-analog converter coupled to the delay circuit for converting the delayed digital signal back to an analog signal.

* * * * *